Anthony J. Derrick's Improved Butter Mould.
No. 121,496.  Patented Dec. 5, 1871.
Fig. 1.
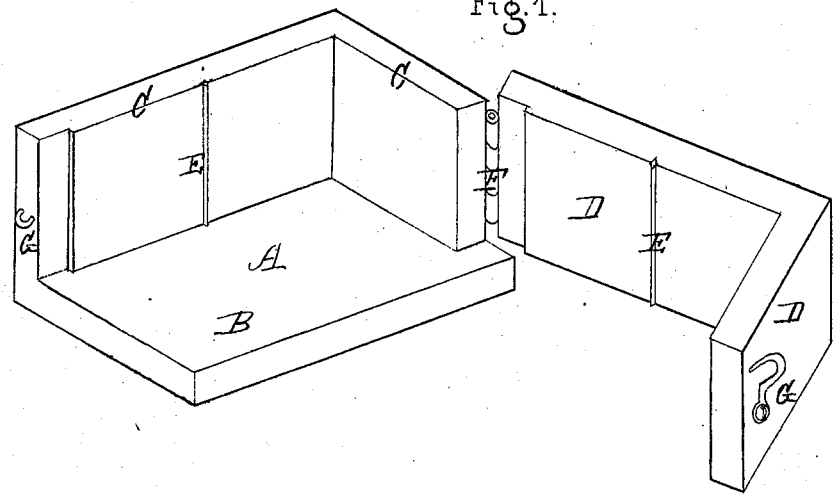
Fig. 2.
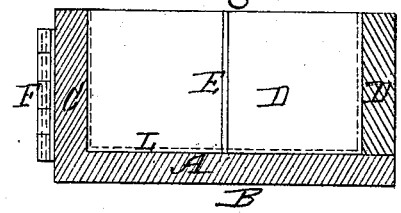
Fig. 3.
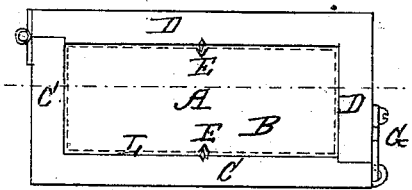
Fig. 4.  Fig. 5.
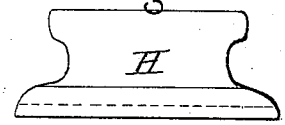 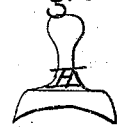
Fig. 6.
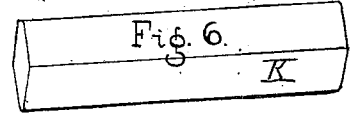
Witnesses:  
Wm. J. Sammons  
Edwin R. Smith
Inventor:  
Anthony J. Derrick 121,496

UNITED STATES PATENT OFFICE.

ANTHONY J. DERRICK, OF SHERIDAN, NEVADA.

IMPROVEMENT IN BUTTER-MOLDS.

Specification forming part of Letters Patent No. 121,496, dated December 5, 1871; antedated November 18, 1871.

*To all whom it may concern:*

Be it known that I, ANTHONY J. DERRICK, of Sheridan, county of Douglas and State of Nevada, have invented an Improved Mold for Forming Butter to the desired weight for market, of which the following is a specification:

Having had occasion as a farmer to send butter to market constantly, I have found much difficulty and loss of time in weighing and forming the butter of the desired form and of positive weight in small quantities to suit customers, for the reason that the butter had to be cut and pieced to make up the proper weight, and when put in a mold to give form to the quantity required it usually stuck to the sides of the mold, making it difficult to remove, and deranging the form and weight of the butter. To obviate these defects in forming and weighing butter for the market I have constructed a butter-mold, oblong in form, with movable sides, and containing a division in the interior for marking off the pounds' weight of butter, by means of which I am enabled to pack and form the butter in the mold and remove the same therefrom without derangement of form or loss of weight, while the weight in pounds is designated by the interior marks, and the butter ready for the market, as I will further explain by reference to the accompanying drawing, in which—

Figure 1 is a perspective view of my invention, showing one-half of the walls of the butter-mold open and the pounds marked on the walls. Fig. 2 is a transverse section of the mold when closed, and Fig. 3 a top view of same, showing pound-marks, hinge-joint, and fastening. Figs. 4 and 5 are views of a hand-press for forcing the butter into the mold, and Fig. 6 a view of scraper for removing the surplus butter from the surface of the mold.

In the said drawing, A indicates the butter-mold, of which B is the bottom; C C, the stationary walls; D D, the movable walls; E E, the pounds-weight mark, running up the sides of the interior of the box; F, the hinge-joint of the stationary and movable walls; and G, the fastening for holding the said walls in position while pressing the butter into the mold. H is a presser for packing the butter into the mold, and K is a scraper for removing the surplus butter from the surface of the said mold. In molding the butter the mold is closed, as shown in Fig. 3, and a thin cloth, L, for holding the butter intact after removal, placed in the bottom and against the sides of the box; the butter is next packed in the box with the presser H, the pound-marks impressing the sides of the butter; next, the scraper is used to remove the surplus butter; and finally the fastening is opened and the movable walls removed from the butter, (see Fig. 1,) when the molded and weighed butter is easily removed from the mold and placed in the vehicle for market. This mold is made to contain two pounds' weight of butter, the side marks dividing the roll into one pound each, but may be enlarged so as to contain several pounds.

What I claim is—

A butter-mold, composed of the stationary walls C C, movable walls D D, connections F G, pounds-weight marks E E, packer H, and scraper K, all arranged and operating as and for the purposes described and set forth.

In testimony whereof I have hereunto set my signature this 4th day of April, 1871.

ANTHONY J. DERRICK.

Witnesses:
WM. J. SAMMONS,
EDWIN R. SMITH.

(45)